United States Patent
Robson et al.

(10) Patent No.: US 10,994,746 B2
(45) Date of Patent: *May 4, 2021

(54) VEHICLE DYNAMIC CONTROL MONITORING SYSTEM

(71) Applicant: Nissan North America, Inc., Franklin, TN (US)

(72) Inventors: Paul Robson, Chandler, AZ (US); Scott Warnecke, Brighton, MI (US)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/752,601

(22) Filed: Jan. 24, 2020

(65) Prior Publication Data

US 2020/0156661 A1     May 21, 2020

Related U.S. Application Data

(63) Continuation of application No. 16/045,424, filed on Jul. 25, 2018, now Pat. No. 10,583,844.

(51) Int. Cl.
*B60W 50/14*     (2020.01)
*B60W 50/04*     (2006.01)

(52) U.S. Cl.
CPC ............ *B60W 50/14* (2013.01); *B60W 50/04* (2013.01); *B60W 2050/143* (2013.01);
(Continued)

(58) Field of Classification Search
CPC .................. B60W 50/14; B60W 50/04; B60W 2050/143; B60W 2050/146; B60W 2530/20
(Continued)

(56) References Cited

U.S. PATENT DOCUMENTS 5,696,681 A * 12/1997 Hrovat .................. B60T 8/1755
                                                 701/70
5,969,681 A     10/1999   O'Neill, Jr.
(Continued)

FOREIGN PATENT DOCUMENTS

KR     20070062138 A     6/2007
KR     20070062277 A     6/2007
(Continued)

OTHER PUBLICATIONS

Excerpt from 2018 Ford F-150 Raptor Owner's Manual (2018).

*Primary Examiner* — John A Tweel, Jr.
(74) *Attorney, Agent, or Firm* — Global IP Counselors, LLP

(57) ABSTRACT

A vehicle dynamic control monitoring system includes a vehicle, a warning indicator, at least one vehicle dynamic control system (VDC), a tire pressure sensor and an electronic controller. The vehicle has a plurality of wheels rotatably mounted to the vehicle. The warning indicator is installed to the vehicle at a location visible to a vehicle operator. The at least one VDC and the tire pressure sensor are installed to the vehicle. The electronic controller is connected to the warning indicator, the at least one VDC and the tire pressure sensor. The electronic controller is configured such that in response to determining that at least one of the wheels has a tire pressure that is below a predetermined tire pressure range, the warning indicator is displayed indicating that the at least one VDC will operate with reduced effectiveness.

20 Claims, 5 Drawing Sheets

(52) U.S. Cl.
 CPC ... *B60W 2050/146* (2013.01); *B60W 2520/10* (2013.01); *B60W 2530/20* (2013.01)

(58) Field of Classification Search
 USPC ........................................................ 340/442
 See application file for complete search history.

(56) References Cited

U.S. PATENT DOCUMENTS

| | | |
|---|---|---|
| 6,918,290 B2 | 7/2005 | Hessmert et al. |
| 7,146,852 B2 | 12/2006 | Suzuki |
| 7,778,741 B2 | 8/2010 | Rao et al. |
| 10,583,844 B2 * | 3/2020 | Robson ............... B60C 23/0401 |
| 2006/0267750 A1 | 11/2006 | Lu et al. |
| 2008/0061625 A1 | 3/2008 | Schmitt et al. |
| 2015/0005982 A1 | 1/2015 | Muthukumar |

FOREIGN PATENT DOCUMENTS

| | | |
|---|---|---|
| KR | 100808488 A | 3/2008 |
| KR | 20080022764 A | 3/2008 |

* cited by examiner

VEHICLE DYNAMIC CONTROL MONITORING SYSTEM

CROSS-REFERENCE TO RELATED APPLICATIONS

This is a continuation application claims that priority under 35 U.S.C. § 119(a) to U.S. patent application Ser. No. 16/045,424, filed on Jul. 25, 2018, the entire contents of which are hereby incorporated herein by reference.

BACKGROUND

Field of the Invention

The present invention generally relates to a vehicle dynamic control monitoring system. More specifically, the present invention relates to a vehicle dynamic control monitoring system that provides an alert signal to a vehicle operator when conditions for a vehicle dynamic control system might not be optimal.

Background Information

Many vehicle manufacturers producing vehicles for the United States market currently include an Electronic Stability Control (ESC) system (also referred to as Electronic Chassis Control Systems or ECCS, and also as a Vehicle Dynamic Control System(s) or VDC), that are used to maintain a vehicle's longitudinal and lateral stability. ESC systems assist a vehicle operator with control accuracy in part by comparing the actual vehicle performance against a vehicle mapping model and by activating when the delta or rate in change between the model and actual exceeds preset parameters. Currently the vehicle mapping models are developed using tire manufacturers' recommended tire pressure(s) which are typically printed on a tire placard on the vehicle and/or in the owner's manual of the vehicle. In the development of these vehicle mapping models, vehicle manufactures usually assume that the vehicle operator will maintain the tires at the recommended inflation pressure or in a range of air pressures from slightly below, to slightly above the recommended inflation pressure.

Many vehicle operators use their vehicles in off-road conditions. When off-roading, a vehicle operator will often "air down" the tires (reduce the air pressure within each tire on the vehicle) to gain a traction advantage on uneven, muddy, and/or rocky surfaces. When a vehicle operator decides to go off-road, and, the vehicle includes a four-wheel drive transmission and transfer case, the vehicle operator will shift from a four-wheel drive high setting to a four-wheel drive low setting, in addition to "airing down" the tires.

SUMMARY

One object of the present disclosure is to provide a vehicle with a four-wheel drive drivetrain with an alert signal to a vehicle operator when conditions for a vehicle dynamic control system are not optimal when the vehicle tires are not within a predetermined pressure range and the drivetrain is in a four-wheel drive high setting.

In view of the state of the known technology, one aspect of the present disclosure is to provide a vehicle dynamic control monitoring system with a vehicle, a warning indicator, at least one vehicle dynamic control system (VDC), a tire pressure sensor and an electronic controller. The vehicle has a plurality of wheels rotatably mounted to the vehicle. The warning indicator is installed to the vehicle at a location visible to a vehicle operator. The at least one VDC and the tire pressure sensor are installed to the vehicle. The electronic controller is connected to the warning indicator, the at least one VDC and the tire pressure sensor. The electronic controller is configured such that in response to determining that at least one of the wheels has a tire pressure that is below a predetermined tire pressure range, the warning indicator is displayed indicating that the at least one VDC will operate with reduced effectiveness.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
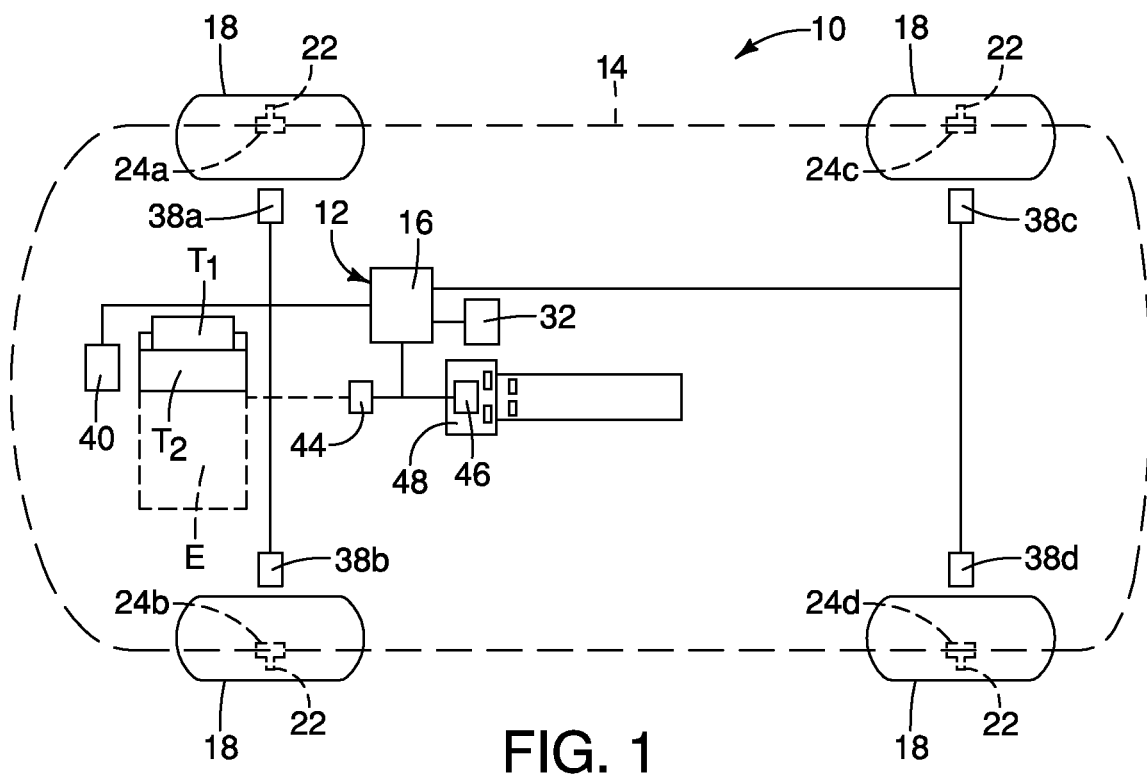
FIG. 1 is a schematic view of a vehicle including a vehicle body structure, tires and a vehicle dynamic control monitoring system in accordance with one embodiment.

Referring initially to FIG. 1, a vehicle 10 with a vehicle dynamic control monitoring system 12 is schematically illustrated in accordance with a depicted embodiment.

The vehicle 10 includes a vehicle body structure 14 shown schematically in FIG. 1. The vehicle dynamic control monitoring system 12 includes a controller 16 that is connected to and/or is in electronic communication with various systems and components of the vehicle 10 that are installed to locations within or on the vehicle body structure 14. A more detailed description of the vehicle dynamic control monitoring system 12 and its controller 16 are described further below, after a description of the vehicle 10.

Figure 3:
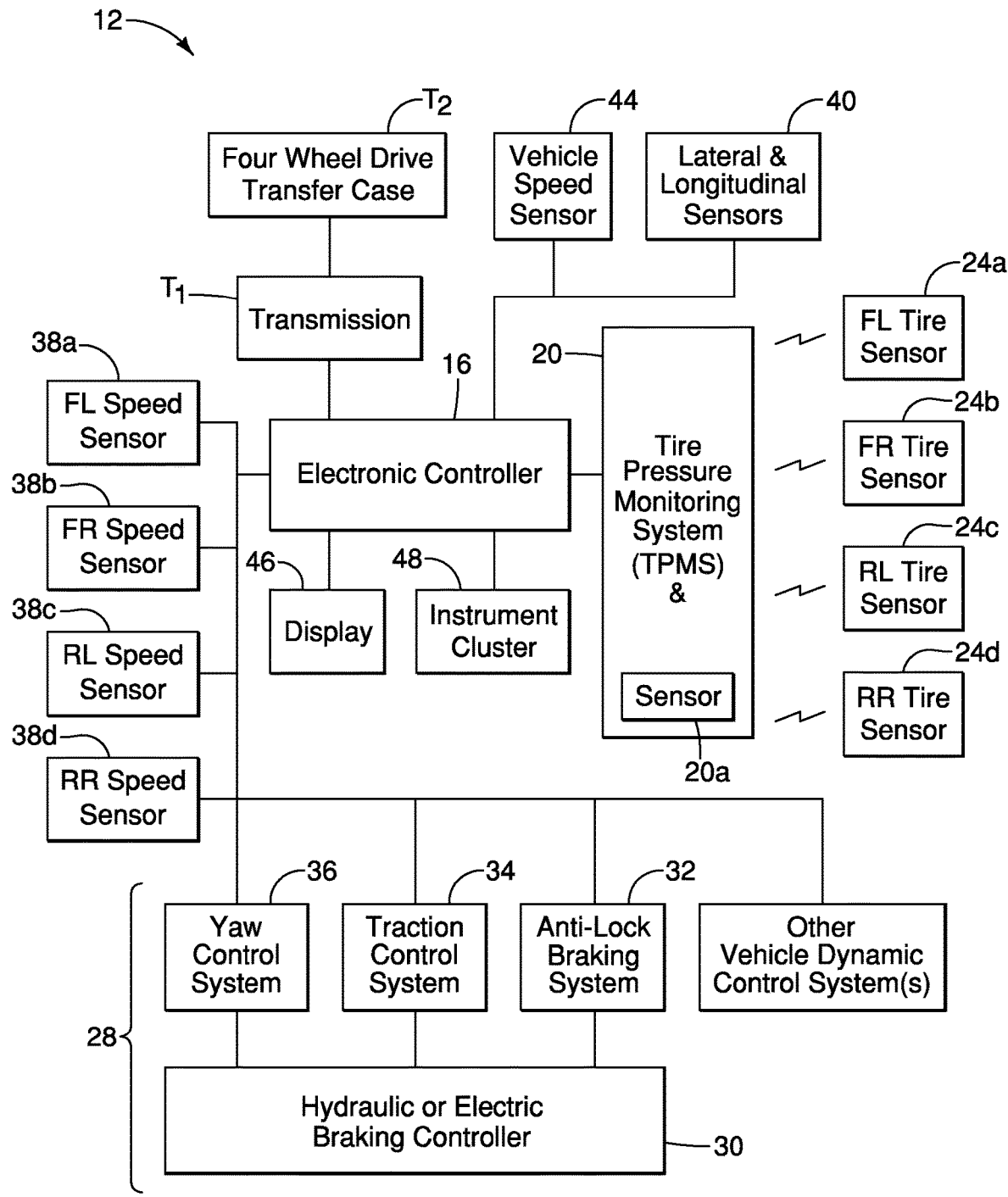
FIG. 3 is a block diagram showing the various elements of the vehicle dynamic control monitoring system in accordance with the depicted embodiment.

The vehicle 10 includes four tires 18 that are rotatably attached to the vehicle body structure 14 in a conventional manner. Further, the vehicle 10 includes power plant E operated by a vehicle operator. The power plant E provides rotary power to a transmission $T_1$ and a four-wheel drive transfer case $T_2$, in a conventional manner. The transmission $T_1$ and the four-wheel drive transfer case $T_2$ are shown schematically in FIGS. 1 and 3. However, it should be understood from the drawings and the description herein that the transmission $T_1$ and/or the four-wheel drive transfer case $T_2$ include drive shafts (not shown) and differential gears (not shown) that connect the transmission $T_1$ and the four-wheel drive transfer case $T_2$ to each of the four tires 18 for transference of rotary power from the power plant E, in a conventional manner. It should further be understood from the drawings and the description herein that the vehicle 10 further includes many body, suspension, structural components and vehicle systems that are conventional features, structures and systems. Since these features, structures and systems are conventional, further description is omitted for the sake of brevity.

The transmission $T_1$ and the four-wheel drive transfer case $T_2$ define a four-wheel drive transmission assembly that receives rotary power from a vehicle power plant E, and is configured to switch between transmitting rotary power via at least a four-wheel drive low setting and a four-wheel drive high setting. The four-wheel drive low setting is defined by a first set of gear ratios that produce vehicle speeds within a first set of speed ranges and the four-wheel drive high setting is defined by a second set of gear ratios that produce vehicle speeds within a second set of speed ranges, each one of the second set of speed ranges being greater than the corresponding ones of first set of speed ranges. Since four-wheel drive transmissions are conventional mechanical devices, further description is omitted for the sake of brevity.

Figure 2:
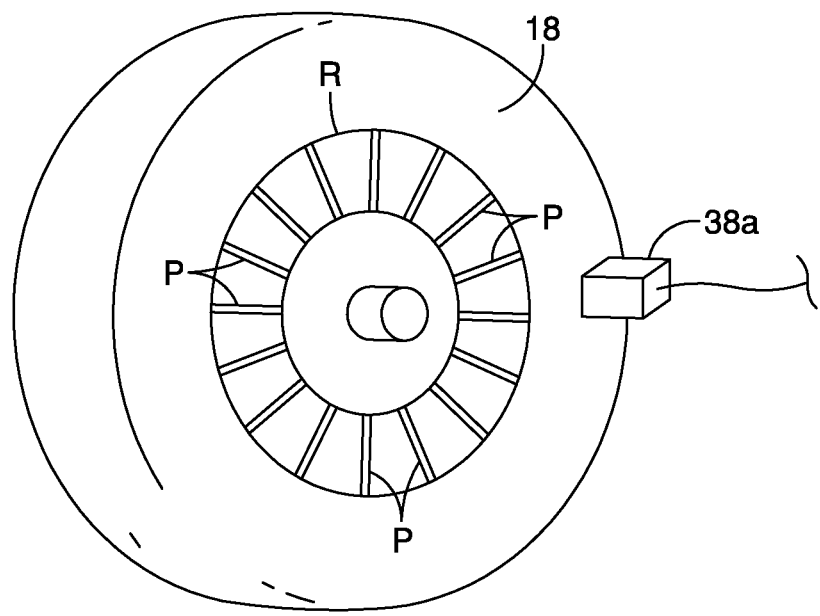
FIG. 2 is a perspective schematic cutaway view of a tire and tire speed sensor rotor of one of the wheels with a rotation sensor that detects relative speed of the tire (wheel) in accordance with the depicted embodiment.
Figure 4:
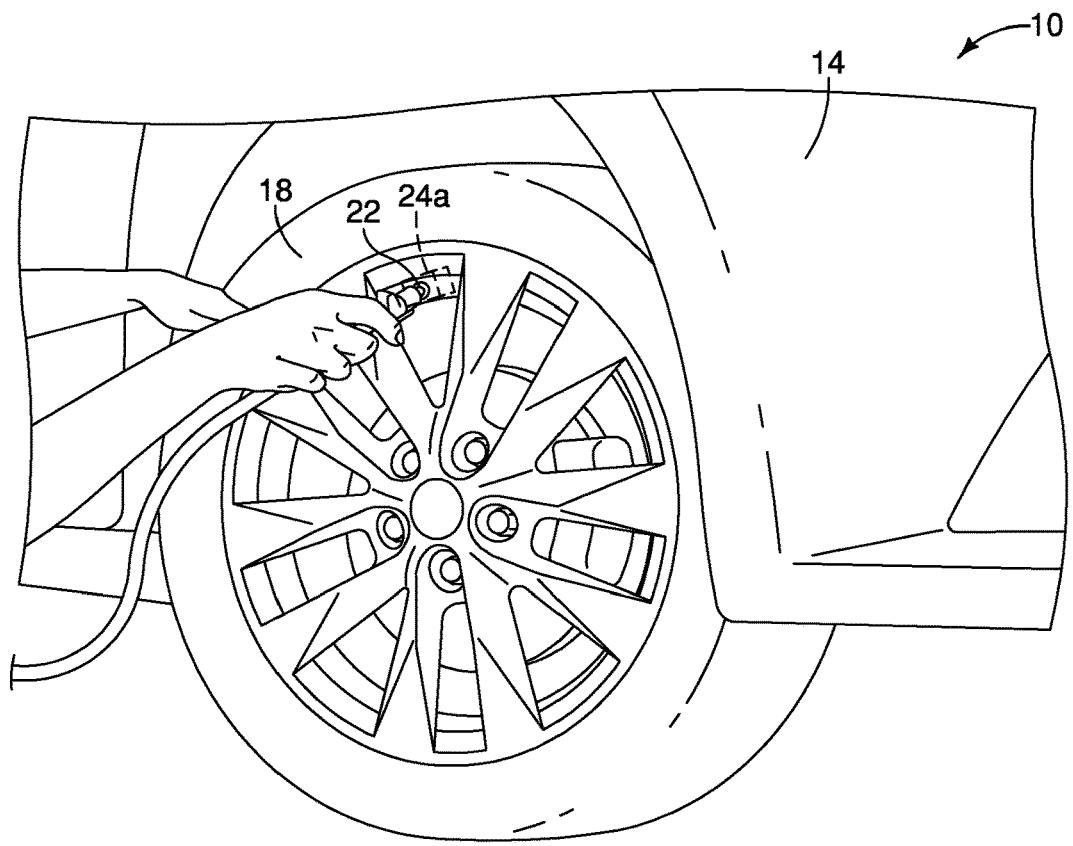
FIG. 4 is a perspective view of a front right side of the vehicle showing a person adding compressed air to or releasing air from one of the tires in accordance with the depicted embodiment.

The vehicle 10 is equipped with a Tire Pressure Monitoring System (TPMS) 20 that monitors the tire pressures in each of the four tires 18. The TPMS 20 includes a sensor 20*a*. Each of the four tires (or wheels) 18 includes a valve stem 22, as shown in FIGS. 1, 2 and 4. Further, each of the valve stems 22 has a corresponding tire pressure sensor 24*a* (front left tire), 24*b* (front right tire), 24*c* (left rear tire) and 24*d* (right rear tire) installed respectively to the tires 18, for rotation therewith. The tire pressure sensors 24*a*, 24*b*, 24*c* and 24*d* transmit signals corresponding to the air pressure in each of their respective tires 18 to the sensor 20*a* of the TPMS 20. The sensor 20*a* can be a radio signal receiver or other appropriate electromagnetic signal receiver configured to receive signals from each of tire pressure sensors 24*a*, 24*b*, 24*c* and 24*d*, where the signals represent air pressure within each of the tires 18. When one or more of the tire pressure sensors 24*a*, 24*b*, 24*c* and 24*d* detects that the air pressure is not within a predetermined range of pressures, the TPMS 20 sends a corresponding signal to the electronic controller 16 with data regarding the air pressure in each of the tires 18.

The predetermined range of pressures is defined by the vehicle manufacturer based upon the tire manufacturer's recommended tire pressure for each of the tires 18, the overall design of the vehicle 10 and testing of the vehicle 10 and tires 18 in on-road driving conditions. For example, for some tires, the tire manufacturer's recommended tire pressure for the tires 18 can be 36 psi (pounds per square inch). Other the tire manufacturers can recommend 32 psi or 40 psi. With the vehicle dynamic control monitoring system 12 described herein, the predetermined range of pressures is assumed to be plus or minus 10% of the tire manufacturer's recommended air pressure for its tires, but can be defined differently based on the vehicle manufacturer's vehicle and tire test results. Hence, the actual range is, at least in part, dependent upon the tires employed on the vehicle 10.

Further, an air pressure measured by one of the tire pressure sensors 24*a*, 24*b*, 24*c* and 24*d* of the TPMS 20 that is 10% or more below the tire manufacturer's recommended air pressure or the predetermined range of pressures defined by the vehicle manufacturer is considered to be an under inflated condition. An air pressure measured by one of the tire pressure sensors 24*a*, 24*b*, 24*c* and 24*d* of the TPMS 20 that is 10% or more greater than the tire manufacturer's recommended air pressure or predetermined range of pressures is considered to be an over-inflated condition.

A description of the vehicle dynamic control monitoring system 12 is now provided with initial reference to FIGS. 1-4. The vehicle dynamic control monitoring system 12 operates in conjunction with an Electronic Stability Control (ESC) system or Electronic Chassis Control Systems (ECCS) that are used to maintain a vehicle's longitudinal and lateral stability. The ECCS system is one type of ESC that has been fine-tuned and mapped for use in the depicted vehicle 10, and other vehicles manufactured by Applicants of the instant application. A brief description of examples of such systems and other systems that are in communication with the electronic controller 16 of the vehicle dynamic control monitoring system 12 is provided below.

A Vehicle Dynamic Control system 28 (VDC system 28) is one example of an Electronic Chassis Control Systems (ECCS) that is used to maintain a vehicle's longitudinal and lateral stability. The VDC system 28 is connected to the electronic controller 16, a hydraulic or electric braking system controller 30, and the power plant E. The VDC system 28 and the electronic controller 16 receive signals from various sensors that monitor vehicle condition and make appropriate interventions to maintain stability. The VDC system 28 and more specifically, the electronic controller 16, can monitor and control various systems of the vehicle 10 in order to maintain vehicle stability, such as utilizing an Anti-lock brake system 32 (ABS 32), a traction control system 34 (TCS 34), and an active Yaw control system 36 (AYC 36), which are described in greater detail below.

The Anti-lock brake system 32 (hereinafter the ABS 32) is a system that operates to prevent one or more of the tires 18 from locking up during a braking operation. The ABS 32 is connected to the tire speed sensors 38*a*, 38*b*, 38*c* and 38*d* that actively measure the rotational speed of each of the tires 18.

There are four rotation sensors 38*a*, 38*b*, 38*c* and 38*d*, one for each tire 18. Since basic operation and function of each the rotation sensors 38*a*, 38*b*, 38*c* and 38*d* are identical, only one rotation sensor 38*a* is described herein below for the sake of brevity. It should be understood from the drawings and the description herein that the description of one rotation sensor applies equally to all of the rotation sensors.

As shown schematically in FIG. 2, the rotation sensor 38*a* adjacent to the tire 18 is configured to detect rotational speed of the tire 18. Specifically, the rotation sensor 38*a* produces rotation data that corresponds to rotation of the tire 18. A portion of a brake rotor (not shown) of each axle/wheel assembly, or an attachment to the brake rotor, includes a plurality of metallic protrusions P circumferentially arranged on thereon. Rotational movement of the metallic protrusions P with the tire 18 move in proximity to the rotation sensor 38a. As each of the metallic protrusions P passes by the rotation sensor 38a, a magnetic field generated by the rotation sensor 38a is disturbed. The magnetic field disturbances produce signals that form the basis for determination of speed of the tire 18. Alternatively, the protrusions P can be defined by magnetic strips fixed to the rotor or an annular plate that rotates with the tire 18. As the annular plate rotates, the rotation sensor 38a detects movement of the magnetic strips.

The ABS 32 is also connected to one or more longitudinal and lateral sensor arrays 40 that determine longitudinal and lateral levels or orientation of the vehicle 10. The speed signals from the tire speed sensors 38a, 38b, 38c and 38d and the orientation data from the longitudinal and lateral sensors 40 are transmitted to the electronic controller 16. The ABS 32 is further connected to the hydraulic or electric braking system controller 30 such that any one (or more) of the tires 18 can be allowed to rotate, rather than locking up, by controlling the braking force (hydraulic pressure) applied to the brake rotor of that tire 18 or tires 18. The ABS 32 helps the vehicle 18 to remain stable during braking operations and can also reduce stopping distance on some surfaces.

The traction control system 34 (hereinafter the TCS 34) is designed to prevent loss of traction of each of the tires 18 while driving in on-road conditions. The tire speeds of each of the tires 18 as measured by the tire speed sensors 38a, 38b, 38c and 38d are provided to the electronic controller 16. When the electronic controller 16 detects that one or more of the tires 18 is rotating more quickly than the others, indicating slippage of that tire or tires 18, the brakes are applied but only to the faster rotating tire or tires 18 using features of the hydraulic or electric braking system controller 30. At the same time, the engine torque output of the power plant E can also be reduced to minimize slippage. The TCS 34 intervention can include, for example, one or more of the following: 1) brake force applied to one or more tires 18; reduction or suppression of spark sequence to one or more cylinders of the power plant E; reduction of fuel supply to one or more cylinders of the power plant E; closing the throttle of the power plant E (if the vehicle is fitted with drive by wire throttle); and, in vehicles with a turbocharger, a boost control solenoid is actuated to reduce boost and therefore engine power of the power plant E.

The Active Yaw Control system 36 (hereinafter the AYC 36) is a system that recognizes a loss of vehicle lateral grip (skidding) of the vehicle 10 is imminent. If imminent slip is detected, AYC 36 intervenes to prevent the loss of grip by utilizing the residual grip on non-slipping wheels to impart corrective moments to the vehicle 10. The vehicle's condition is monitored by a series of sensors including but not limited to wheel speed, steering angle, and yaw (rotational moment) via the tire speed sensors 38a, 38b, 38c and 38d, the longitudinal and lateral sensor arrays 40 and sensors on the steering linkage and/or steering column (not shown). The AYC 36 uses selective braking interventions to generate desired counteracting force to slip moment, so that the car reacts as the driver intends.

The vehicle dynamic control monitoring system 12 can further include an optional vehicle speed sensor 44, a display 46 (also referred to as an input device 46) and an instrument cluster 48 (also referred to as a display or electronic display). The vehicle speed sensor 44 can be connected to, for example, the transmission $T_1$ or the output shaft of the transfer case $T_2$ and measures the speed of the vehicle 10. Alternatively, the vehicle speed can be determined by the signals received from the rotation sensors 38a, 38b, 38c and 38d. The display 46 can be a video monitor or touch screen display installed to an instrument panel within the passenger compartment of the vehicle 10 in a location easily observed by the vehicle operator. The display 46 can be part of the instrument cluster 48 or can be installed at a location spaced apart from the instrument cluster 48.

Figure 7:
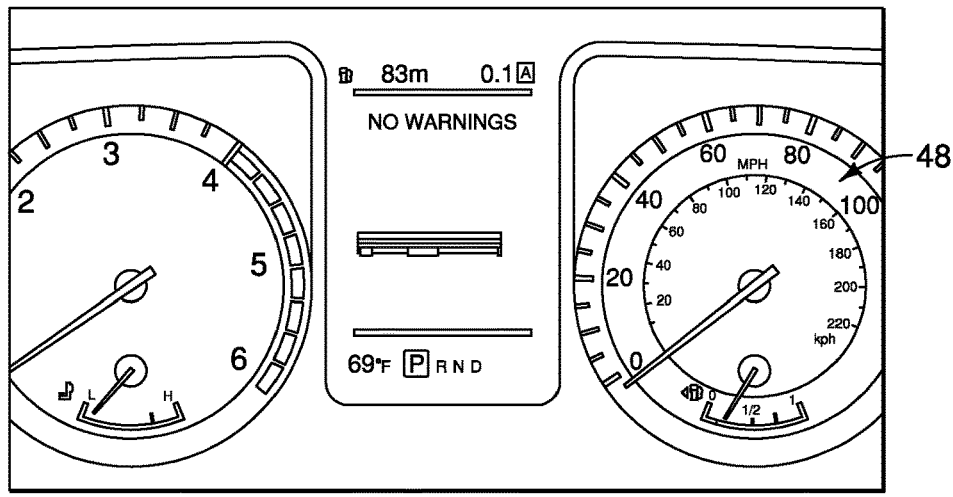
FIG. 7 is a plan view of an instrument cluster of the vehicle showing a tachometer, a display and a speedometer in accordance with the depicted embodiment.
Figure 8:
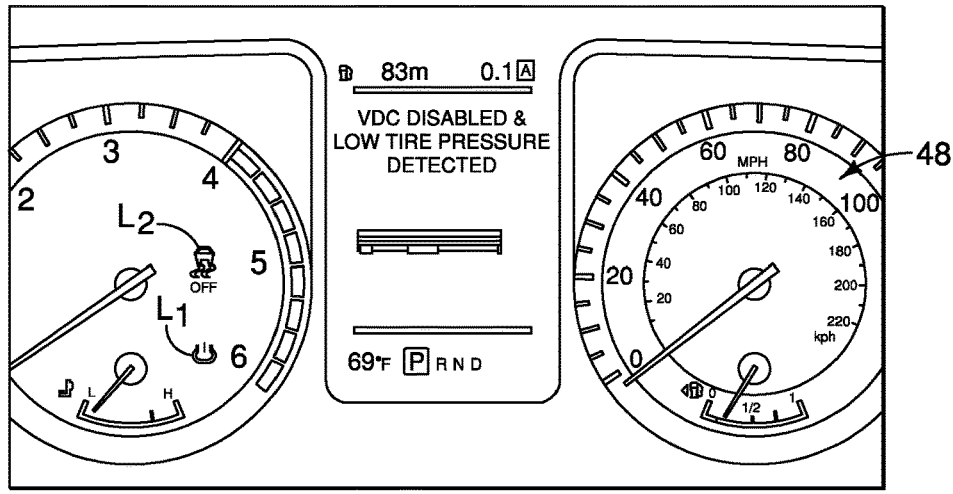
FIG. 8 is another plan view of an instrument cluster of the vehicle showing both a first warning light (tire pressure lamp) and a second warning light (VDC operation lamp) illuminated in accordance with the depicted embodiment.
Figure 9:
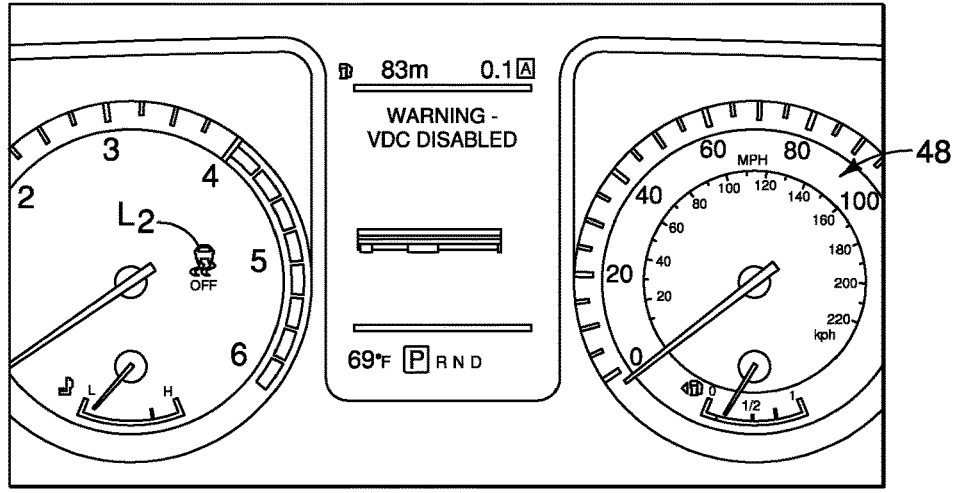
FIG. 9 is yet another plan view of an instrument cluster of the vehicle showing only the second warning light (VDC operation lamp) illuminated in accordance with the depicted embodiment.

The instrument cluster 48 is shown in FIGS. 7, 8 and 9, and, includes a speedometer, a tachometer, and at least two warning lamps, a first lamp $L_1$ and a second lamp $L_2$. The first lamp $L_1$ is part of the TPMS 20 and is illuminated in response to the electronic controller 16 determining that at least one tire 18 has a measured air pressure that is lower than a predetermined air pressure preferred in the tires 18, as described in greater detail below. The second lamp $L_2$ is connected to the VDC system 28, and, is illuminated in response to determination of conditions described in greater detail below.

The electronic controller 16 preferably includes a microcomputer with a vehicle dynamic control monitoring system control program that controls the TPMS 20, the display 46, and the VDC system 28, including the hydraulic or electric braking system controller 30, the ABS 32, the TCS 34 and the AYC 36, as discussed herein. The electronic controller 16 can also include other conventional components such as an input interface circuit, an output interface circuit, and storage devices such as a ROM (Read Only Memory) device and a RAM (Random Access Memory) device and electronic storage devices or drives (all hereinafter referred to collectively as electronic memory). The microcomputer of the electronic controller 16 is programmed to control the vehicle dynamic control monitoring system 12. The memory circuit stores processing results and control programs such as ones for the vehicle dynamic control monitoring system 12 operations that are run by the processor circuit. The electronic controller 16 is operatively coupled to the various vehicle components and components of the vehicle dynamic control monitoring system 12 in a conventional manner. The internal RAM of the electronic controller 16 stores statuses of operational flags and various control data. The internal ROM of the electronic controller 16 stores data communication protocols and commands for various operations. The electronic controller 16 is capable of selectively controlling any of the components of the control system of the vehicle dynamic control monitoring system 12 in accordance with the control program. It will be apparent to those skilled in the art from this disclosure that the precise structure and algorithms for the electronic controller 16 can be any combination of hardware and software that will carry out the functions of the vehicle dynamic control monitoring system 12.

The electronic controller 16 installed within the vehicle body structure 14 and is in electronic communication with the electronic memory, transmission $T_1$, the four-wheel drive transfer case $T_2$, the TPMS 20 (including the tire pressure sensors 24a, 24b, 24c and 24d), the VDCs 28 (including the ABS 32, the TCS 34, and the AYC 36), hydraulic or electric braking system controller 30, the tire speed sensors 38a, 38b, 38c and 38d, sensor array 40, the vehicle speed sensor 44, the display 46 and the instrument cluster 48 (aka alerting device 48).

The electronic memory of the electronic controller 16 stores at least a first preset tire pressure and a second preset tire pressure for each of the plurality of tires 18. The first preset tire pressure is for use for paved road driving conditions (on-road driving) and is based on the tire manufacturers recommended inflation pressure and vehicle design factors, as described above. The first preset tire pressure is a range of pressures defined as plus or minus 10% of the tire manufacturers recommended inflation pressure (and possible vehicle design factors). The second preset tire pressure intended for use with off-road driving conditions (off-road driving, such as driving in hilly conditions, rocky conditions, sand, mud, etc). The second preset tire pressure varies from vehicle to vehicle and is initially defined with a default setting that is approximately half of the first preset tire pressure. However, the second preset tire pressure can also be re-defined by a vehicle operator and saved in memory as a specific air pressure determined by the vehicle operator. The vehicle operator can have specific preferences for tire air pressure based on experience and knowledge of off-road driving experience.

The electronic controller 16 is configured to perform a plurality of tasks and operations, and, is programed to evaluate and process data from the various sensors and systems connected thereto, along with data relating to various on-road and off-road conditions, such as those described below.

The VDC system 28 (and related systems) typically have associated there with a vehicle mapping model (vehicle map) that is based on extensive driving tests and drive modelling of each vehicle model. In other words, each vehicle (a specific SUV design, a specific four-wheel drive vehicle, etc.) has its own constructed vehicle map stored in memory and is used by the electronic controller such that each anticipated challenge, such as the vehicle 10 moving over a patch of ice, or driving on a slippery surface, is met with action initiated by the electronic controller 16 to stabilize the movement of the vehicle. Such vehicle mapping models are usually constructed using vehicle operation data that is based upon the tires 18 being maintained with an air pressure corresponding to on-road driving conditions (the first preset tire pressure described above). Since such vehicle models are conventional and vary from vehicle model to vehicle model, further description is omitted for the sake of brevity.

When the vehicle 10 is operating in on-road conditions in either standard two-wheel drive, or four-wheel drive high mode, and the TPMS 20 determines that the tire pressure in all four tires 18 is above a minimum value of the first preset tire pressure, the electronic controller 16 turns both the tire pressure low warning lamp $L_1$ and the VDC lamp $L_2$ off, as indicated in FIG. 7.

The vehicle 10 is designed such that the vehicle 10 can be driven off-road with off-road driving conditions. If the vehicle operator has lowered the air pressure in each of the tires 18 (the tires being aired down) for off-road driving (as shown in FIG. 4), the TPMS 20 via the electronic controller 16 turns on the tire pressure low warning lamp $L_1$, as shown in FIG. 8.

Further, when the transmission $T_1$ and transfer case $T_2$ are shifted from, for example, the four-wheel drive high setting to the four-wheel drive low setting, some of the systems of, or associated with, the VDC system 28 are disabled or partially disabled. For instance, the ABS 32, the TCS 34 and the AYC 36 can have certain responses (based on the vehicle mapping modeling) in on-road driving, and, can have a different set of response in off-road driving with different levels of aggressiveness. Alternatively, when driving in off-road conditions, one or more of the ABS 32, the TCS 34 and the AYC 36 can be completely disabled (shut off). Consequently, when the electronic controller 16 determines that the vehicle 10 is being operated in off-road conditions (such as when shifted to the four-wheel drive low setting), the electronic controller 16 turns on the VDC lamp $L_2$ indicating that the VDC systems 28 are disabled (shut off) or partially disabled.

Hence, the electronic controller 16 is configured such that: in response to determining that at least one of the wheels (tires 18) has a tire pressure that is below the predetermined tire pressure range (below a minimum value of the first preset tire pressure), the electronic controller 16 turns on the tire pressure warning signal $L_1$; and in response to determining that at least one of the wheels (tires 18) has a tire pressure that is below the predetermined tire pressure range (below a minimum value of the first preset tire pressure), and the vehicle 10 is moving above a predetermined vehicle speed, a VDC warning indicator is displayed on the electronic display indicating that the at least one VDC will operate with reduced effectiveness or has been disabled.

The predetermined vehicle speed mentioned above is, for example, any speed above 20 miles per hour. However, the predetermined vehicle speed is not limited to this value, but, can be a value determined based upon the design and dynamic responses of the vehicle 10. Hence, the predetermined vehicle speed can be a vehicle specific predetermined value anywhere between 15 mph and 35 mph.

Further, the electronic controller 16 is further configured such that in response to determining that the four-wheel drive transmission assembly ($T_1$ and $T_2$) is switched to the four-wheel drive low setting, the at least one VDC is at least partially disabled, and, in response to determining that the four-wheel drive transmission assembly ($T_1$ and $T_2$) is switched to the four-wheel drive high setting, the at least one VDC is enabled.

As well, the electronic controller 16 is further configured such that in response to determining that at least one of the wheels has a tire pressure that is greater than the predetermined tire pressure range (above a maximum value of the first preset tire pressure), the tire pressure warning signal (the lamp $L_1$) is not indicated by the electronic display, the VDC warning indicator (the lamp $L_2$) is displayed on the electronic display (instrument cluster 48) indicating that the at least one VDC will operate with reduced effectiveness.

Figure 5:
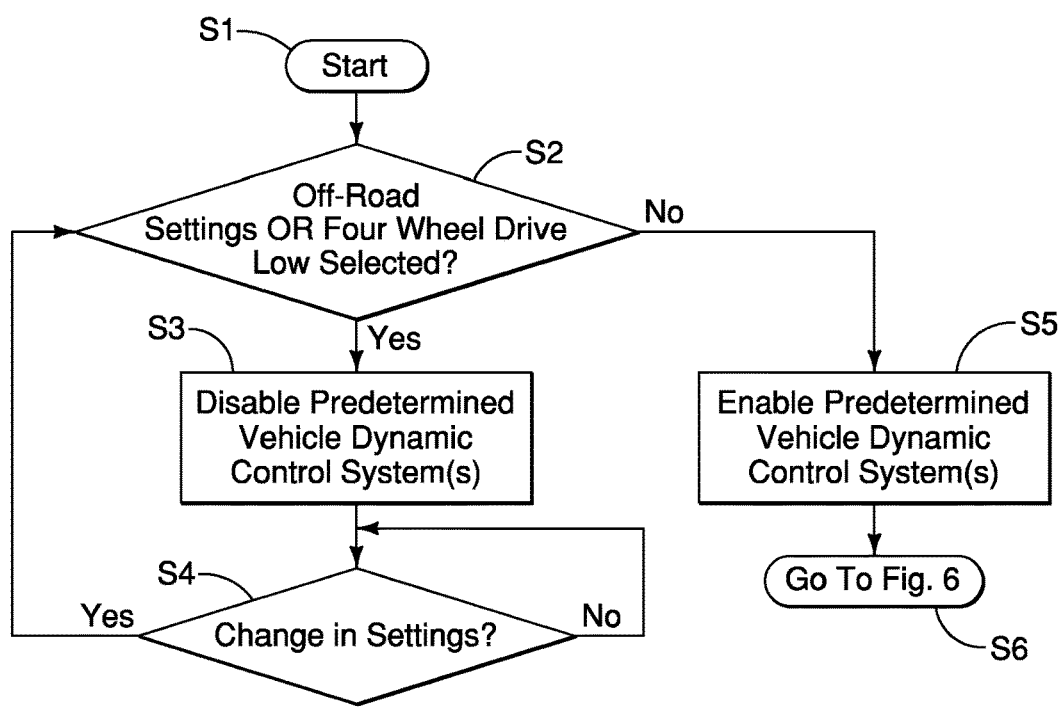
FIG. 5 is a first flowchart showing a first portion of one example of logic used to operate the vehicle dynamic control monitoring system in accordance with the depicted embodiment.
Figure 6:
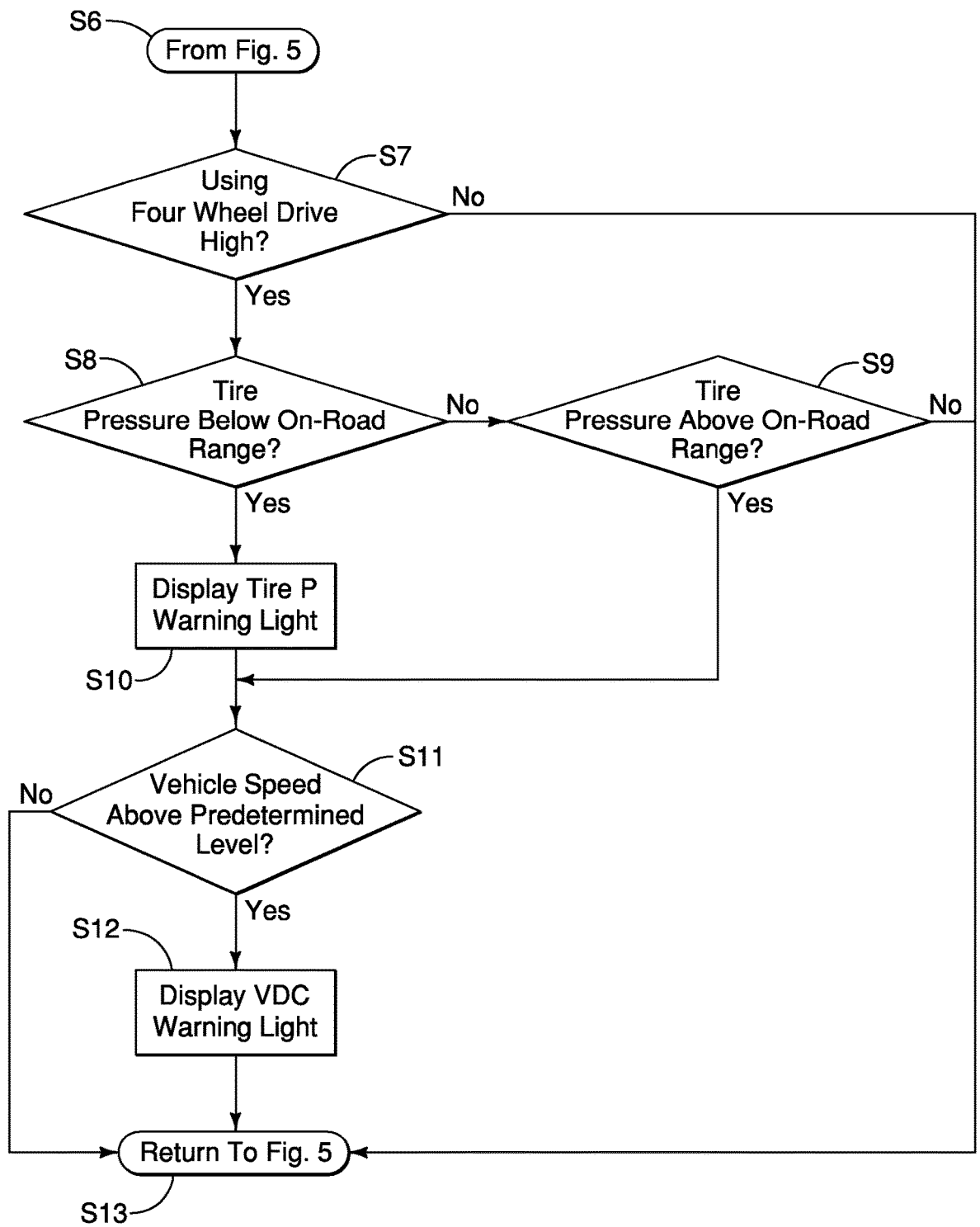
FIG. 6 is a second flowchart showing a further portion of one example of logic used to operate the vehicle dynamic control monitoring system in accordance with the depicted embodiment.

A description of one example of logic used by the electronic controller 16 is now provided with specific reference to FIGS. 5 and 6.

In the first flowchart shown in FIG. 5, the electronic controller 16 starts operation as step S1, where the system can go through an initialization sequence and can then stand by for detection of activity. At step S2, the electronic controller 16 determines whether or not an off-road setting has been selected by the vehicle operator (if the vehicle is equipped with such capability) or, alternatively, determines whether or not the transmission $T_1$ and transfer case $T_2$ have been switched to operatie in the four-wheel drive low mode. If no, operation moves to step S5, described further below. If yes, operation moves to step S3 where some or all of the VDC systems 28 (the ABS 32, the TCS 34 and/or the AYC 36) are partially or completely disabled. Next at step S4, the electronic controller 16 determines whether or not there has been a change in the settings of the transmission $T_1$ and transfer case $T_2$ or any other related setting that affects drivability of the vehicle 10. If not, the electronic controller 16 goes into a standby mode continuing to monitor settings of the transmission $T_1$ and transfer case $T_2$. If yes, then operation returns to step S2.

At step S2, if no operation moves to step S5 where the VDC systems 28 are enabled and operation moves to step S6 and further to the logic set forth in the flowchart in FIG. 6.

In FIG. 6, at step S7, the electronic controller 16 determines whether or not the vehicle 10 is being operated with the transmission $T_1$ and transfer case $T_2$ set in the four-wheel drive high setting or mode. If no, operation returns to FIG. 5 at step S13. If yes, operation moves to step S8. At step S8, the electronic controller 16 determines whether or not the tires 18 are below the predetermined tire pressure range (below a minimum value of the first preset tire pressure). If no, operation moves to step S9. At step S9, the electronic controller 16 determines whether or not the tires 18 are above the predetermined tire pressure range (above a maximum value of the first preset tire pressure). If no, operation returns to FIG. 5 at step S13. If yes, operation moves to step S11, described further below.

Returning to step S8, if yes, then operation moves to step S10 where the electronic controller 16 (via the TPMS 20) turns on the tire pressure warning lamp $L_1$ as shown in FIG. 8. Next at step S11, the electronic controller 16 determines whether or not the vehicle 10 is moving above the predetermined vehicle speed (defined above). If no, operation returns to FIG. 5 at step S13. If yes, then operation moves to step S12, where the electronic controller 16 turns on the VDC warning lamp $L_2$, as shown in FIGS. 8 and 9.

Thus, the vehicle operator is alerted to the state of operation of the VDC systems 28 based upon both tire pressure in the tires 18 and the operational settings of the transmission $T_1$ and transfer case $T_2$.

Additionally, a VDC tire pressure range can be predetermined and used by the electronic controller 16, as described below. The VDC tire pressure range can be one or two air pressure ranges where a first range is below the minimum value of the predetermined tire pressure range, and a second range that is above the maximum value of the predetermined tire pressure range. Under certain circumstances, one or more of the at least one VDC may not operate optimally. Each of the above VDCs 28 has its own limitations and its own vehicle map or model for optimal operating conditions. The VDC tire pressure range provides additional refinement with respect to VDC usage as set forth in the above description. The VDC tire pressure range can be selected air pressure ranges corresponding to over inflation, as described above, or can be air pressure levels that are lower than the predetermined tire pressure range. For example, in a vehicle where the tire manufacturer's is 36 psi, the predetermined tire pressure range of the TPMS 20 would be a range of between approximately 32 and 40 psi. If the tire pressure is above 32 psi, then the warning lamp $L_1$ of the TPMS 20 will not be illuminated. Below 32 psi, the warning lamp $L_1$ of the TPMS 20 will be illuminated. The first range of the VDC tire pressure range (depending upon the vehicle design) can be, for example, 10-24 psi. In other words, one or more of the VDCs 28 may have less that optimal effectiveness below 24 psi, causing the lamp $L_2$ to be illuminated. The second range of the VDC tire pressure range (depending upon the vehicle design) can be, for example, any pressure above 50 psi. In other words, one or more of the VDCs 28 may have less than optimal effectiveness above 50 psi, causing the lamp $L_2$ to be illuminated. Consequently, the electronic controller 16 can be configured such that in response to determining that at least one of the wheels has a tire pressure that is below a minimum value of the predetermined tire pressure range but above the first range of the VDC tire pressure range, the lamp $L_1$ will be illuminated but not the lamp $L_2$. Once the tire pressure is below 24 psi, the lamp $L_2$ will be illuminated.

In a modification of the VDC tire pressure range, the first range can be further divided into first section of the first range, and a second section of the first range, continuing with the example above, the first section of the first range can be between 20-24 psi causing the lamp $L_2$ to blink indicating that one or more of the VDCs 28 has been disabled. The second section of the first range can be below 20 psi causing the lamp $L_2$ will be continuously illuminated indicating that all of the VDCs 28 have been disabled and are not operating.

In the above alternative configuration of the vehicle dynamic control monitoring system 12, it should be understood that the various ranges are examples only and that each vehicle is tested to map or model the responses of each of the VDCs 28 in a conventional manner. Further, the TPMS 20 operates as described above.

The various vehicle structures and elements of the vehicle 10, other than the vehicle dynamic control monitoring system 12, are conventional components that are well known in the art. Since such vehicle structures and elements of the vehicle 10 are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the vehicle dynamic control monitoring system. Accordingly, these terms, as utilized to describe the present invention should be interpreted relative to a vehicle equipped with the vehicle dynamic control monitoring system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle dynamic control monitoring system, comprising:
   a vehicle having a plurality of wheels rotatably mounted to the vehicle;
   a warning indicator installed to the vehicle at a location visible to a vehicle operator;
   at least one vehicle dynamic control system (VDC) installed to the vehicle;
   a tire pressure sensor installed to the vehicle; and
   an electronic controller connected to the warning indicator, the at least one VDC and the tire pressure sensor, the electronic controller being configured such that
   in response to determining that at least one of the wheels has a tire pressure that is below a predetermined tire pressure range, the warning indicator is displayed indicating that the at least one VDC will operate with reduced effectiveness.

2. The vehicle dynamic control monitoring system according to claim 1, wherein
   the at least one VDC includes an anti-lock braking system (ABS) installed to the vehicle.

3. The vehicle dynamic control monitoring system according to claim 2, wherein
   the at least one VDC includes a traction control system (TCS) installed to the vehicle.

4. The vehicle dynamic control monitoring system according to claim 3, wherein
   the at least one VDC includes an active yaw control system (AYS) installed to the vehicle.

5. The vehicle dynamic control monitoring system according to claim 1, wherein
   the at least one VDC includes a traction control system (TCS) installed to the vehicle.

6. The vehicle dynamic control monitoring system according to claim 1, wherein
   the at least one VDC includes an active yaw control system (AYS) installed to the vehicle.

7. The vehicle dynamic control monitoring system according to claim 1, wherein
   the vehicle includes a four-wheel drive transmission assembly that receives rotary power from a vehicle power plant, the four-wheel transmission assembly is configured to switch between transmitting rotary power via at least a four-wheel drive low setting and a four-wheel drive high setting, where the four-wheel drive low setting is defined by a first set of gear ratios that produce vehicle speeds within a first set of speed ranges and the four-wheel drive high setting is defined by a second set of gear ratios that produce vehicle speeds within a second set of speed ranges, each one of the second set of speed ranges being greater than the corresponding ones of first set of speed ranges.

8. The vehicle dynamic control monitoring system according to claim 7, wherein
   the electronic controller is further configured such that in response to determining that the four-wheel drive transmission assembly is switched to the four-wheel drive low setting, the at least one VDC is at least partially disabled, and, in response to determining that the four-wheel drive transmission assembly is switched to the four-wheel drive high setting, the at least one VDC is enabled.

9. The vehicle dynamic control monitoring system according to claim 8, wherein
   the electronic controller is further configured such that in response to determining that at least one of the wheels has a tire pressure that is greater than the predetermined tire pressure range, the tire pressure warning signal is not indicated, the warning indicator is displayed indicating that the at least one VDC will operate with reduced effectiveness.

10. The vehicle dynamic control monitoring system according to claim 1, wherein
    the electronic controller is further configured such that in response to determining that at least one of the wheels has a tire pressure that is greater than the predetermined tire pressure range, a tire pressure warning signal is not indicated, the warning indicator is displayed indicating that the at least one VDC will operate with reduced effectiveness.

11. The vehicle dynamic control monitoring system according to claim 1, further comprising:
    a tire pressure monitoring system (TPMS) system that is configured to monitor air pressure within each the wheels of the vehicle, where the predetermined tire pressure range is defined as being ± (plus or minus) 10% of a wheel manufacturer's recommended tire pressure for each of the wheels.

12. The vehicle dynamic control monitoring system according to claim 1, wherein
    the predetermined vehicle speed is any speed above 20 miles per hour.

13. A vehicle dynamic control monitoring system, comprising:
    a vehicle having a plurality of wheels rotatably mounted to the vehicle;
    an electronic display installed to the vehicle at a location visible to a vehicle operator;
    at least one vehicle dynamic control system (VDC) installed to the vehicle;
    a tire pressure sensor installed to the vehicle; and
    an electronic controller connected to the electronic display, the sensor, and the at least one VDC, the electronic controller being configured such that
    in response to determining that at least one of the plurality of wheels has a tire pressure that is below a predetermined tire pressure range, a tire pressure warning signal is indicated by the electronic display and a VDC warning indicator is not indicated by the electronic display, and
    in response to determining that at least one of the wheels has a tire pressure that is below a minimum value of the predetermined tire pressure range and within of a first section of a VDC tire pressure range below the predetermined tire pressure range, the tire pressure warning signal is indicated by the electronic display, and, the VDC warning indicator is displayed on the electronic display indicating that the at least one VDC is disabled.

14. The vehicle dynamic control monitoring system in accordance with claim 13, wherein
the electronic controller is further configured such that in response to determining that at least one of the plurality of wheels has a tire pressure that is above a maximum value of the predetermined tire pressure range and within of a second range of the VDC tire pressure range above the predetermined tire pressure range, the tire pressure warning signal is not indicated by the electronic display, and, the VDC warning indicator is displayed on the electronic display indicating that the at least one VDC is disabled.

15. The vehicle dynamic control monitoring system in accordance with claim 13, wherein
the at least one VDC system includes a plurality of VDC systems, and
the electronic controller is further configured such that the first range of the VDC tire pressure range includes a first section and a second section, the first section having air pressures greater than in the second section, and in response to determining that at least one of the wheels has a tire pressure that is within of the first section of the first range of the VDC tire pressure range, the VDC warning indicator is operated to blink on the electronic display indicating that one or more of the plurality of VDC systems are disabled, and in response to determining that at least one of the wheels has a tire pressure that is within of the second section of the first range of the VDC tire pressure range, the VDC warning indicator is operated to display continuously on the electronic display indicating that each of the plurality of VDC systems are disabled.

16. The vehicle dynamic control monitoring system according to claim 13, wherein
the vehicle includes a four-wheel drive transmission assembly that receives rotary power from a vehicle power plant, the four-wheel transmission assembly is configured to switch between transmitting rotary power via at least a four-wheel drive low setting and a four-wheel drive high setting, where the four-wheel drive low setting is defined by a first set of gear ratios that produce vehicle speeds within a first set of speed ranges and the four-wheel drive high setting is defined by a second set of gear ratios that produce vehicle speeds within a second set of speed ranges, each one of the second set of speed ranges being greater than the corresponding ones of first set of speed ranges, and
the electronic controller is further configured such that in response to determining that the four-wheel drive transmission assembly is switched to the four-wheel drive low setting, the at least one VDC is at least partially disabled, and, in response to determining that the four-wheel drive transmission assembly is switched to the four-wheel drive high setting, the at least one VDC is enabled.

17. The vehicle dynamic control monitoring system according to claim 16, wherein
the electronic controller is further configured such that in response to determining that at least one of the wheels has a tire pressure that is below the predetermined tire pressure range and the four-wheel drive transmission assembly is switched from the four-wheel drive low setting to the four-wheel drive high setting the at least one VDC is enabled and the VDC warning indicator is displayed on the electronic display indicating that the at least one VDC is disabled.

18. A vehicle dynamic control monitoring system, comprising:
a vehicle that has a vehicle power plant, and a plurality of wheels rotatably mounted to the vehicle;
at least one vehicle dynamic control system (VDC) installed to the vehicle;
a tire pressure monitoring system (TPMS) system installed to the vehicle;
a four-wheel drive transmission assembly that receives rotary power from the vehicle power plant, the four-wheel transmission assembly being configured to switch between transmitting rotary power via at least a four-wheel drive low setting and a four-wheel drive high setting, where the four-wheel drive low setting is defined by a first set of gear ratios that produce vehicle speeds within a first set of speed ranges and the four-wheel drive high setting is defined by a second set of gear ratios that produce vehicle speeds within a second set of speed ranges, each one of the second set of speed ranges being greater than the corresponding ones of first set of speed ranges, and
an electronic controller connected to the TPMS, the at least one VDC, the TPMS and the four-wheel drive transmission assembly, the electronic controller being configured such that
in response to determining that at least one of the wheels has a tire pressure that is below a predetermined tire pressure range, a tire pressure warning signal is indicated, and
in response to determining that at least one of the wheels has a tire pressure that is below the predetermined tire pressure range and the four-wheel drive transmission assembly has been switched to the four-wheel drive high setting, the tire pressure warning signal is indicated and a VDC warning indicator is displayed indicating that the at least one VDC will operate with reduced effectiveness or is disabled.

19. The vehicle dynamic control monitoring system according to claim 18, wherein
the electronic controller is further configured such that in response to determining that at least one of the wheels has a tire pressure that is below the predetermined tire pressure range and the vehicle is moving above a predetermined vehicle speed, the tire pressure warning signal is indicated and a VDC warning indicator is displayed indicating that the at least one VDC is disabled.

20. The vehicle dynamic control monitoring system according to claim 19, wherein
the predetermined vehicle speed is any speed above 20 miles per hour.

\* \* \* \* \*